June 28, 1966  T. H. BENTTINEN ETAL  3,257,751
FISHING LURE
Filed July 23, 1964
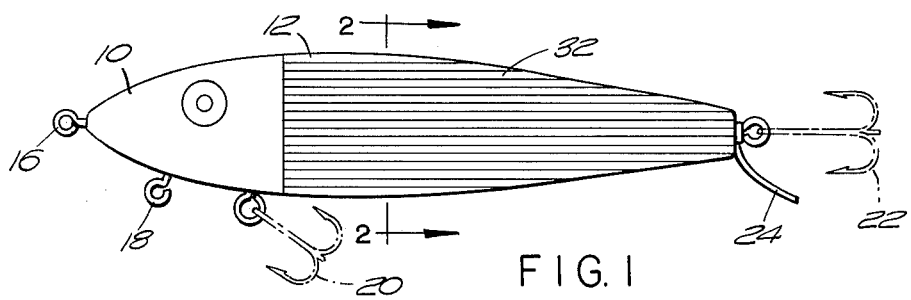
FIG. 1
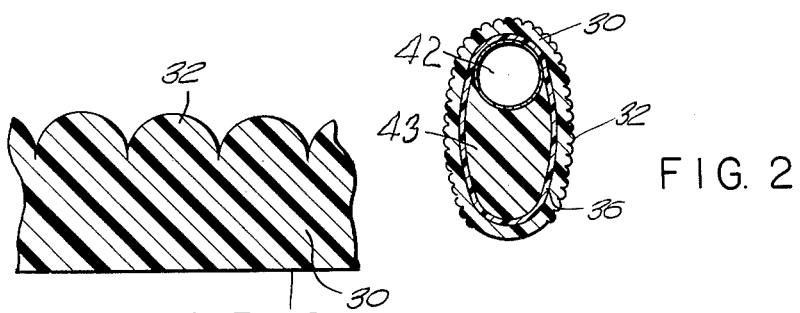
FIG. 3
FIG. 2
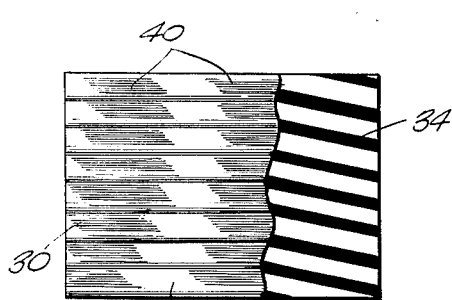
FIG. 4
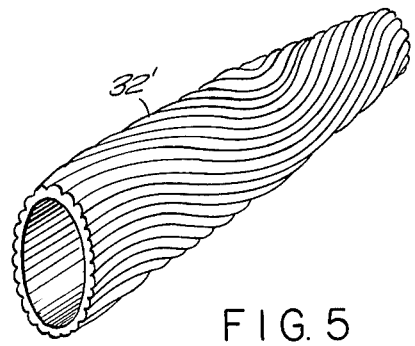
FIG. 5
INVENTORS
THEODORE H. BENTTINEN
FREDERICK L. BENTTINEN
BY
Morse, Altman & Oates
ATTORNEYS

United States Patent Office 3,257,751
Patented June 28, 1966

3,257,751
FISHING LURE
Theodore H. Benttinen, 235 Lakeview Ave., and Frederick L. Benttinen, Box 270, both of Falmouth, Mass.
Filed July 23, 1964, Ser. No. 384,584
3 Claims. (Cl. 43—42.33)

This invention relates to a fishing lure of the type made to resemble a small fish. Lures of this kind are usually pulled through the water on the end of a fishing line so as to present the appearance of a small fish swimming. As it is believed that in addition to the movement of a lure as a whole through the water, quick changes in the appearance of the lure involving real or apparent movements of color areas on the sides of the lure are apt to attract the attention of larger fish, an object of the invention is to provide means by which the body of the lure presents the appearance of substantial areas of contrasting colors which move when the lure itself rocks, the apparent movements of the color areas being magnified by a lens system so that up-and-down and back-and-forth movements of such areas are increased in amplitude, thus more effectively attracting the attention of larger fish. This is done, as hereinafter described, by forming a series of narrow, longitudinally extending lenses on the surface of the body portion of the lure which cooperate with a series of narrow bands of contrasting colors behind these lenses to produce the desired effect. For a more complete understanding of the invention, reference may be had to the following description thereof and to the drawing, of which FIGURE 1 is a side elevation of a fishing lure embodying the invention;

FIGURE 2 is a slightly enlarged section taken on the line 2—2 of FIGURE 1;

FIGURE 3 is a fragmentary magnified transverse section of a piece of material such as is used for the exterior of the body portion of the lure;

FIGURE 4 is a fragmentary magnified elevational view of material used for the outer portion of the body of the lure; and FIGURE 5 is a perspective view of a modified form of the outer portion of the body of the lure.

The fishing lure illustrated in FIGURE 1 is in the form of a small fish having a head 10 and a body 12. As usual, eyes 16, 18 are secured to the head 10 to provide for the attachment of a trolling or casting line to the lure. Multiple fish-hooks 20, 22 are attached to the lure as and where desired. Attached at the tail is a small rigid plate 24 of metal or plastic, a face of which is presented to the direction of movement of the lure in such a way as to cause the lure to rock from side to side as it is being drawn through the water.

The body portion 12 of the lure is elongated and may have any desired cross-sectional shape such as the oval shape indicated in FIGURE 2. This portion is characterized by a corrugated or corduroy-type of outer surface on an outer layer or member 30 of a transparent material such as, for example, cellulose acetate butyrate, polymethyl methacrylate or glass. The outer surface is composed of elongated ribs 32 of arcuate cross-section extending longitudinally of the lure and in side to side contact as indicated in FIGURE 3. Each such rib is a cylindrical lens which has a cross-section which may be semi-circular or of lesser depth and the width of such ribs will generally be from 1/8" to 1/30". Lengthwise the ribs 32 may be approximately straight as indicated in FIGURE 1 or may be sinuous as indicated at 32' in FIGURE 5.

Within the outer member 30 and visible therethrough is a striped pattern 34 of contrasting colors. This pattern may be furnished on a paper liner 36 within the outer member 30, or it may be imprinted on the inner face 38 of the member 30, or it may be placed on the surface of an inner body member 43 around which the outer member 30 can be molded so that the pattern 34 and outer member 30 will be in contact. The stripes of one color in pattern 34 may be narrower than stripes of the other color, but the combined widths of one stripe of each color should equal the width, of one of the cylindrical lenses 32. These stripes are arranged at an angle to the ribs, preferably a small angle of 5° or so. When the pattern is suitably spaced from the lens surfaces an image of magnified colored areas 40 is visible. If the lure is rocked when being viewed from the side, the magnified color areas 40 appear to have augmented movements to right and left. By the use of different color patterns and different shapes and widths of cylindrical lenses, an indefinite number of combinations can be made. One such combination is shown in FIGURE 4 to illustrate how an illusion of movement is created. When the dark stripes of pattern 34 cross the ribs 32 at small angles a number of larger dark bands 40 are visible through outer member 30. In the specific illustration in FIGURE 4 a roll of a few degrees will cause a decided lateral movement of the bands 40. Since it appears that motion is what attracts the attention of fish, this augmented lateral motion of the magnified colored areas, coupled with the forward motion of the lure as it is drawn through the water makes the lure more attractive to fish. In other words, it functions more effectively as a lure.

For effective magnification of the color areas, the striped pattern should be suitably spaced from the cylindric lenses by a distance less than the focal length of the lens when the lens unit is immersed in water. In the case of cylindric lenses with approximately semi-circular cross-sections the pattern should be spaced from two to eight times the radius of curvature of the lens from the surface of the lens. The member 30 should be made sufficiently thick, as indicated in FIGURES 2 and 3, so that if the striped pattern is placed directly against the inner surface of the member 30 or imprinted thereon, it will be suitably spaced from the cylindric surface.

The lure may be ballasted in any suitable way to adjust its buoyancy and to keep the top or dorsal portion uppermost. For this purpose the interior of the member 30 may be filled with a member 43 of the same or other material, a hollow 42 being left in the upper part of the member 43 to provide a measure of stability to the lure.

Several variations from the specific details of the invention hereinbefore described can be employed. For example, the striped pattern can be arranged at varying distances from the outer surface of the member 30, or a pattern may have wavy stripes like the lenses shown in FIGURE 5 in combination with straight lenses as shown in FIGURE 1. Other minor changes may be made without departing from the scope of the invention as defined in the following claims.

We claim:
1. A fishing lure in the form of a small fish having a head portion and a body portion, said body portion including an outer layer of transparent material formed on its outer surface with sinuous longitudinally extending ribs having arcuate cross-sections and disposed side by side, and longitudinal stripes of contrasting colors disposed inwardly of said outer layer, said stripes being arranged to extend at small angles to said ribs.
2. A fishing lure in the form of a small fish having a head portion and a body portion, said body portion including an outer layer of transparent material the outer surface of which comprises longitudinally extending semi-cylindrical ribs in side-by-side contact and longitudinal stripes within said outer layer making an angle of about 5 degrees with said ribs, the width of each pair of stripes being approximately equal to the width of one of said ribs, and means on said lure for inducing a steady rocking motion of the lure when it is drawn through the water.
3. A fishing lure as described in claim 2, said means including a downwardly and rearwardly curved plate secured to the tail end of said body portion, and a towing eye secured to the head portion, said body being substantially solid except for a hollow in the upper part thereof.

References Cited by the Examiner

UNITED STATES PATENTS

| | | | |
|---|---|---|---|
| 592,631 | 10/1897 | Hollander | 88—1 |
| 1,590,529 | 6/1926 | Larzelere et al. | 43—42.47 |
| 2,752,721 | 7/1956 | Denny | 43—42.33 |
| 3,069,801 | 12/1962 | Mills | 43—42.33 |
| 3,122,853 | 3/1964 | Koonz et al. | 43—42.33 X |

FOREIGN PATENTS 566,753  1/1945  Great Britain.

ANTONIO F. GUIDA, *Acting Primary Examiner.*

SAMUEL KOREN, ABRAHAM G. STONE, *Examiners.*

R. L. HOLLISTER, *Assistant Examiner.*